United States Patent
Takemori et al.

(10) Patent No.: US 8,744,715 B2
(45) Date of Patent: Jun. 3, 2014

(54) SKID DETECTION APPARATUS FOR VEHICLE

(75) Inventors: Yuichiro Takemori, Wako (JP); Hirohiko Totsuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/806,061

(22) PCT Filed: Jul. 19, 2011

(86) PCT No.: PCT/JP2011/066318
§ 371 (c)(1),
(2), (4) Date: Dec. 20, 2012

(87) PCT Pub. No.: WO2012/011459
PCT Pub. Date: Jan. 26, 2012

(65) Prior Publication Data
US 2013/0110317 A1 May 2, 2013

(30) Foreign Application Priority Data
Jul. 20, 2010 (JP) .................................. 2010-162662

(51) Int. Cl.
*B60T 7/12* (2006.01)
(52) U.S. Cl.
USPC ................ 701/74; 701/71; 701/70; 701/82; 701/91
(58) Field of Classification Search
USPC ........... 701/71, 74, 90, 91, 82, 69, 89, 70, 80, 701/65, 79; 303/122.02, 122.06, 144, 174, 303/175, 189, 150, 163, 113.2, 139, 148, 303/166; 180/197
See application file for complete search history.

(56) References Cited

U.S. PATENT DOCUMENTS

| | | | |
|---|---|---|---|
| 4,763,260 A * | 8/1988 | Sakuma et al. ................ | 701/80 |
| 4,866,625 A | 9/1989 | Kawamoto et al. | |
| 4,947,332 A * | 8/1990 | Ghoneim ........................ | 701/84 |
| 6,272,417 B1 * | 8/2001 | Ross et al. ...................... | 701/71 |
| 6,301,540 B1 * | 10/2001 | Kato et al. ...................... | 701/71 |
| 2002/0002436 A1 | 1/2002 | Nishida et al. | |
| 2006/0037804 A1 | 2/2006 | Sugo et al. | |

FOREIGN PATENT DOCUMENTS

| | | |
|---|---|---|
| DE | 37 21 629 A1 | 1/1988 |
| DE | 101 17 230 A1 | 12/2001 |
| EP | 1 630 028 A2 | 3/2006 |
| GB | 2 192 160 A | 1/1988 |

(Continued)

OTHER PUBLICATIONS

Supplementary European Search Report, European Patent Application No. 11809626.6 dated Mar. 3, 2014.

*Primary Examiner* — Helal A Algahaim
*Assistant Examiner* — Genna Mott
(74) *Attorney, Agent, or Firm* — Arent Fox LLP

(57) ABSTRACT

In a skid detecting apparatus for a vehicle having an engine and a CVT changing an output of the engine in speed to drive front wheels and rear wheels, it is configured to detect rotational speeds of one of the front and rear wheels, sequentially calculate accelerations (wheel accelerations var1, var2) of the one of the wheels based on the detected rotational speeds, calculate a ratio (var1/var2) between two accelerations of the same wheel calculated at different time points among the sequentially-calculated accelerations (S10), compare the ratio between the two accelerations with a predetermined value (S16) and determine that the one of the wheels has skidded or some or all of the wheels including the one have skidded when the calculated ratio between the two accelerations exceeds the predetermined value (S18).

10 Claims, 3 Drawing Sheets

(56) References Cited

FOREIGN PATENT DOCUMENTS

| | | |
|---|---|---|
| JP | 63-011432 A | 1/1988 |
| JP | 09-095225 A | 4/1997 |
| JP | 2001-287561 A | 10/2001 |
| JP | 2006-056444 A | 3/2006 |
| JP | 2007-092823 A | 4/2007 |
| WO | WO 2008/024217 A2 | 2/2008 |

* cited by examiner

SKID DETECTION APPARATUS FOR VEHICLE

CROSS-REFERENCED TO RELATED APPLICATION

This application is a National Stage entry of International Application PCT/JP2011/066318, filed Jul. 19, 2011, which claims priority to Japanese Patent Application No. 2010-162662, filed Jul. 20, 2010, the disclosure of the prior application(s) are hereby incorporated in their entirety by reference.

TECHNICAL FIELD

This invention relates to a skid detection apparatus for a vehicle, particularly to an apparatus that detects a skid(s) of front and rear wheels of a four-wheel drive vehicle.

BACKGROUND ART

In (not a four-wheel drive vehicle but) a two-wheel drive vehicle, a wheel skid is determined based on a difference between an average speed of front wheels and that of rear wheels, as taught, for example, by the Patent Reference 1 below.

PRIOR ART REFERENCE

Patent Reference

Patent Reference 1: Japanese Laid-Open Patent Application No. 2007-92823

SUMMARY OF INVENTION

Problems to be Solved by the Invention

In the case of the four-wheel drive vehicle, when front wheels and rear wheels simultaneously skid, a difference between the front and rear wheel speeds is not generated. The aforementioned technique can be applied to detect a skid that has occurred on either side (front or rear) of the wheels but is not applicable for detecting skids that have simultaneously occurred at the front and rear wheels.

An object of this invention is therefore to overcome the foregoing drawback by providing a skid detection apparatus for a vehicle that can accurately detect a skid(s) of a four-wheel drive vehicle in not only the case where one of the front and rear wheels skids but also the case where all (or some) of the front and rear wheels simultaneously skid.

Means for Solving the Problems

In order to achieve the object, as recited in claim 1, this invention is configured to have an apparatus for detecting a skid of a vehicle having a prime mover and a transmission adapted to change an output of the prime mover in speed to drive front wheels and rear wheels, characterized by: wheel rotational speed detecting means for detecting rotational speeds of one of the front and rear wheels; wheel acceleration ratio calculating means for sequentially calculating accelerations of the one of the wheels based on the detected rotational speeds and calculating a ratio between two accelerations among the sequentially-calculated accelerations; and skid determining means for comparing the ratio between the two accelerations with a predetermined value and determining that the one of the wheels has skidded or some or all of the wheels including the one have skidded when the calculated ratio between the two accelerations exceeds the predetermined value.

In the apparatus according to claim 2, the wheel acceleration ratio calculating means calculates the ratio between the two accelerations calculated during a predetermined time period among the sequentially-calculated accelerations.

In the apparatus according to claim 3, the skid determining means determines that the one of the wheels has skidded or some or all of the wheels including the one have skidded when a driving force of the vehicle is equal to or less than a driving force preset value and the calculated ratio between the two accelerations exceeds the predetermined value.

In the apparatus according to claim 4, the skid determining means determines that the one of the wheels has skidded or some or all of the wheels including the one have skidded when a driving force change amount of the vehicle is equal to or less than a driving force change amount preset value and the calculated ratio between the two accelerations exceeds the predetermined value.

In the apparatus according to claim 5, the wheel acceleration ratio calculating means sets a prescribed value as the calculated acceleration when the calculated acceleration is equal to or less than the prescribed value and calculates the ratio between the two accelerations among the sequentially-calculated accelerations.

Effects of the Invention

In a skid detecting apparatus for a vehicle according to claim 1, it is configured to detect rotational speeds of one of the front and rear wheels; sequentially calculate accelerations of the one of the wheels based on the detected rotational speeds and calculate a ratio between two accelerations (of the same wheel calculated at different time points) among the sequentially-calculated accelerations; and determine that the one of the wheels has skidded or some or all of the wheels including the one have skidded when the calculated ratio between the two accelerations exceeds a predetermined value. With this, in not only the case where one of the front and rear wheels skids but also the case where some (all) of the wheels including the one, i.e., the front and rear wheels are simultaneously skid, it becomes possible to accurately detect the skid(s), more precisely, a possibility of the simultaneous skids of the front and rear wheels.

To be more specific, the technique of the Patent Reference 1 is configured to determine whether a skid has occurred based on the difference between the average speed of the front wheels and that of the rear wheels. As a result, when the front and rear wheels simultaneously skid in the four-wheel drive vehicle, since the difference between the front and rear wheel speeds is not generated, the simultaneous skids of the front and rear wheels can not be detected.

In contrast, in the apparatus according to claim 1, it is configured to detect a skid(s) not by detecting the difference between the wheel speeds of the front and rear wheels but by observing one of the wheels, for instance, the left front wheel, right rear wheel or the like, i.e., detect a skid(s) without comparing rotational speeds of two wheels. Consequently, it becomes possible to accurately detect not only the skid of the observed one of the wheels but also the simultaneous skids of some or all of the wheels, more precisely, a possibility of the simultaneous skids of the front and rear wheels.

In the apparatus according to claim 2, it is configured to calculate the ratio between the two accelerations calculated during a predetermined time period among the sequentially-calculated accelerations. With this, in addition to the above effect, since only the values calculated during the predetermined time period are used, the detection accuracy can be improved.

In the apparatus according to claim 3, it is configured to determine that the one of the wheels has skidded or some or all of the wheels including the one have skidded when a driving force of the vehicle is equal to or less than a driving force preset value and the calculated ratio between the two accelerations exceeds the predetermined value. With this, in addition to the above effects, it becomes possible to prevent the false detection, thereby improving the detection accuracy.

In the apparatus according to claim 4, it is configured to determine that the one of the wheels has skidded or some or all of the wheels including the one have skidded when a driving force change amount of the vehicle is equal to or less than a driving force change amount preset value and the calculated ratio between the two accelerations exceeds the predetermined value. With this, in addition to the above effects, similarly, it becomes possible to prevent the false detection, thereby improving the detection accuracy.

In the apparatus according to claim 5, it is configured to set a prescribed value as the calculated acceleration when the calculated acceleration is equal to or less than the prescribed value and calculate the ratio between the two accelerations among the sequentially-calculated accelerations. With this, in addition to the above effects, it becomes possible to not take in consideration the case where the wheel acceleration becomes equal to or less than the prescribed value due to a temporal cause, etc., and therefore, thereby improving the detection accuracy.

DESCRIPTION OF EMBODIMENT

An embodiment for carrying out a skid detection apparatus for a vehicle according to the present invention will now be explained with reference to the attached drawings.

Embodiment

Figure 1:
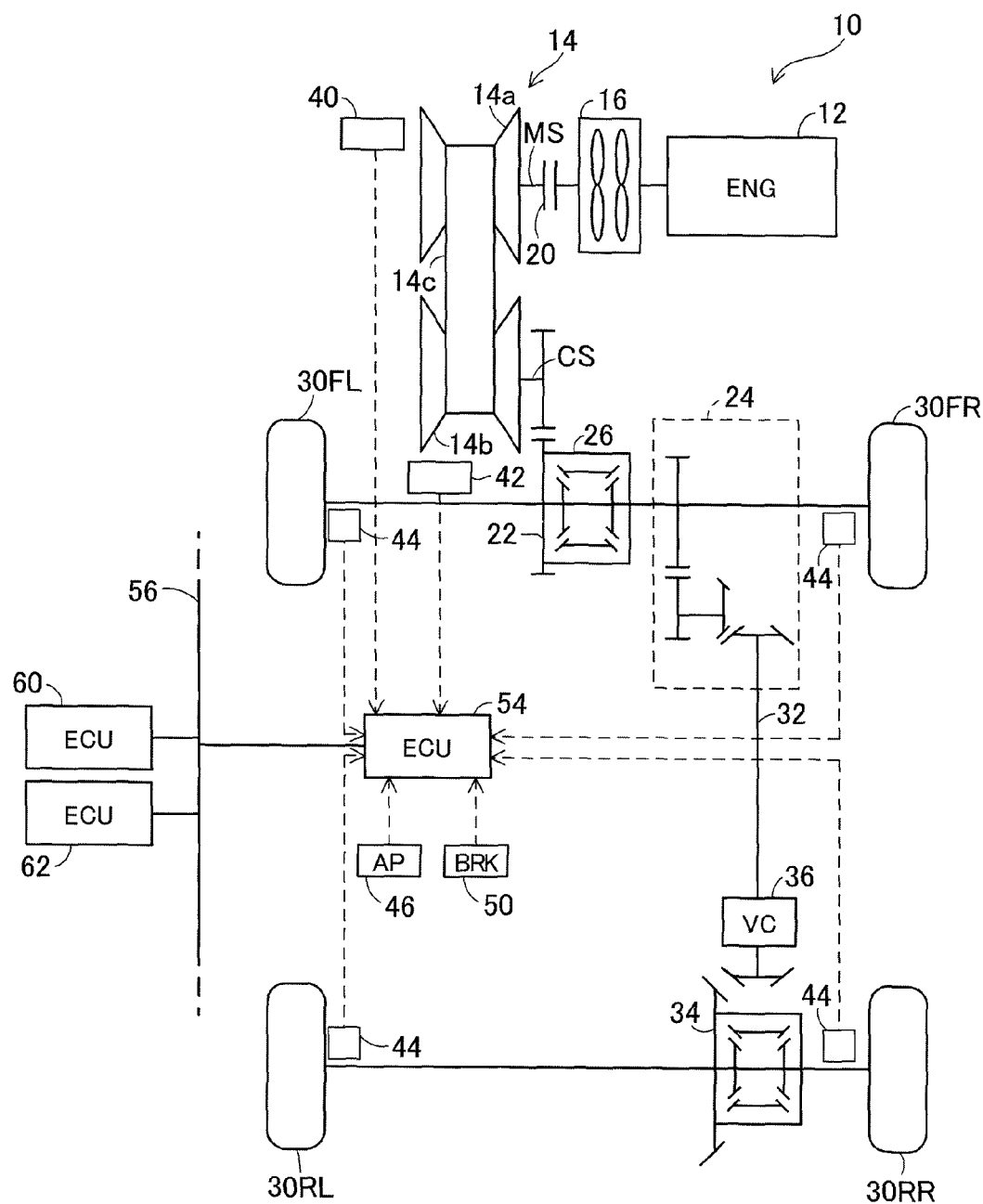
FIG. 1 is an overall view schematically showing a skid detection apparatus for a vehicle according to an embodiment of this invention.

FIG. 1 is an overall view schematically showing a skid detection apparatus for a vehicle according to an embodiment of this invention.

In FIG. 1, symbol 10 designates a vehicle. The vehicle 10 is mounted with an internal combustion engine (prime mover; hereinafter called the "engine") 12 that is a gasoline-injected, water-cooled engine. An output of the engine 12 is inputted to a Continuous Variable Transmission (CVT; transmission) 14.

The CVT 14 includes a drive pulley 14a installed at a main shaft MS, a driven pulley 14b installed at a countershaft CS, a metal belt 14c wound around the pulleys, and a hydraulic pressure mechanism (not shown) adapted to supply operating oil to the belt 14c. The CVT 14 is inputted with an output of the engine 12 from the main shaft MS through a torque converter 16 and forward clutch 20 and changes the engine output in speed with a continuously or steplessly controlled gear ratio.

The engine output after being changed in speed by the CVT 14 is transmitted through the countershaft CS and a reduction gear 22 to a transfer 24 that distributes the engine output to a front wheel side and rear wheel side. The output for the front wheel side is transferred to the front wheels 30FL, 30FR through a front differential mechanism 26.

The output for the rear wheel side is transmitted to the rear wheels 30RL, 30RR through a propeller shaft 32 and rear differential mechanism 34. Thus, the vehicle 10 is configured as a four-wheel drive type vehicle that changes the output of the engine 12 in speed by the CVT 14 to operate the front and rear wheels 30F, 30R.

A Viscous Coupling (hereinafter called the "VC") 36 is interposed at the propeller shaft 32. The VC 36 has a number of clutch plates housed in its case and silicon oil (fluid) of high viscosity is sealed therein. The VC 36 transfers power using a shear force generated by rotational difference between the plates.

An NDR (rotational speed of drive pulley) sensor 40 installed near the drive pulley 14a of the CVT 14 produces an output or signal corresponding to an input rotational speed of the CVT 14, while an NDN (rotational speed of driven pulley) sensor 42 installed near the driven pulley 14b produces an output or signal corresponding to an output rotational speed of the CVT 14.

Wheel speed sensors (wheel rotational speed detecting means) 44 are installed near drive shafts (not shown) of the left and right front wheels 30FL, 30FR and the left and right rear wheels 30RL, 30RR and each of the sensors 44 produces an output or signal indicative of a rotational speed (wheel speed) of the associated wheel 30, i.e., the associated one of the front and rear wheels 30FL, 30FR, 30RL, 30RR.

An accelerator position (AP) sensor 46 is installed near an accelerator pedal (not shown) provided on the floor of the operator's (driver's) seat of the vehicle 10 and produces an output or signal indicative of an accelerator position or opening AP (an amount of operator's manipulation (depression) of the accelerator pedal). A brake (BRK) switch 50 installed near a brake pedal (not shown) produces an ON signal upon manipulation of the brake pedal by the operator.

The outputs of the forgoing sensors and switch are sent to an Electronic Control Unit (ECU) 54. The ECU 54 has a microcomputer including a CPU, ROM, EEPROM, RAM, input/output circuits, and other components. The ECU 54 controls the operation of the CVT 14.

The ECU 54 is connected through a CAN (Controller Area Network) 56 to an ECU 60 that controls the operation of the engine 12, an ECU 62 that performs traction control, anti-skid control, etc, and other devices.

Next, the operation of the apparatus according to the embodiment will be explained.

Figure 2:
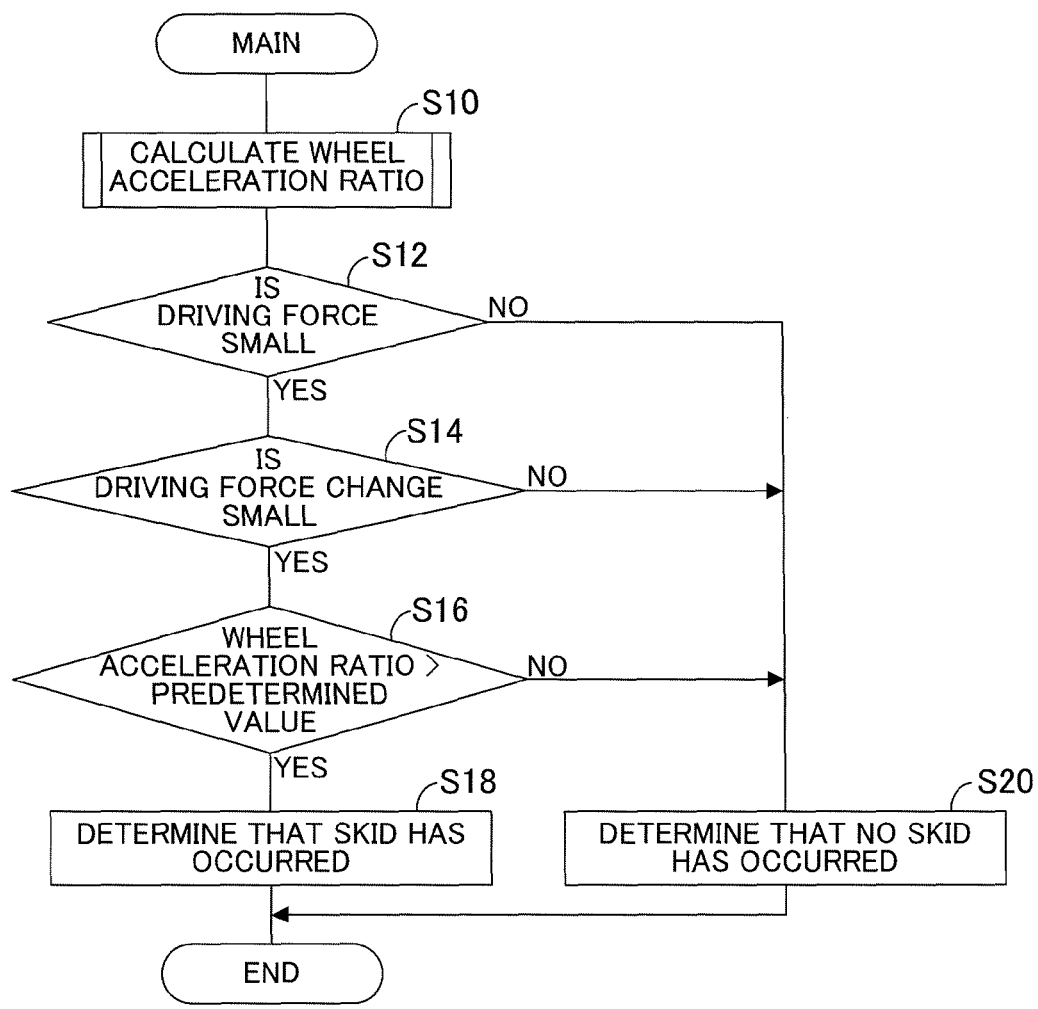
FIG. 2 is a flowchart showing an operation of the apparatus shown in FIG. 1.

FIG. 2 is a flowchart showing the operation, which is executed by the ECU 54 at predetermined intervals (e.g., 10 milliseconds).

The program begins at S (Step; Processing step) 10 in which a wheel acceleration ratio is calculated.

Figure 3:
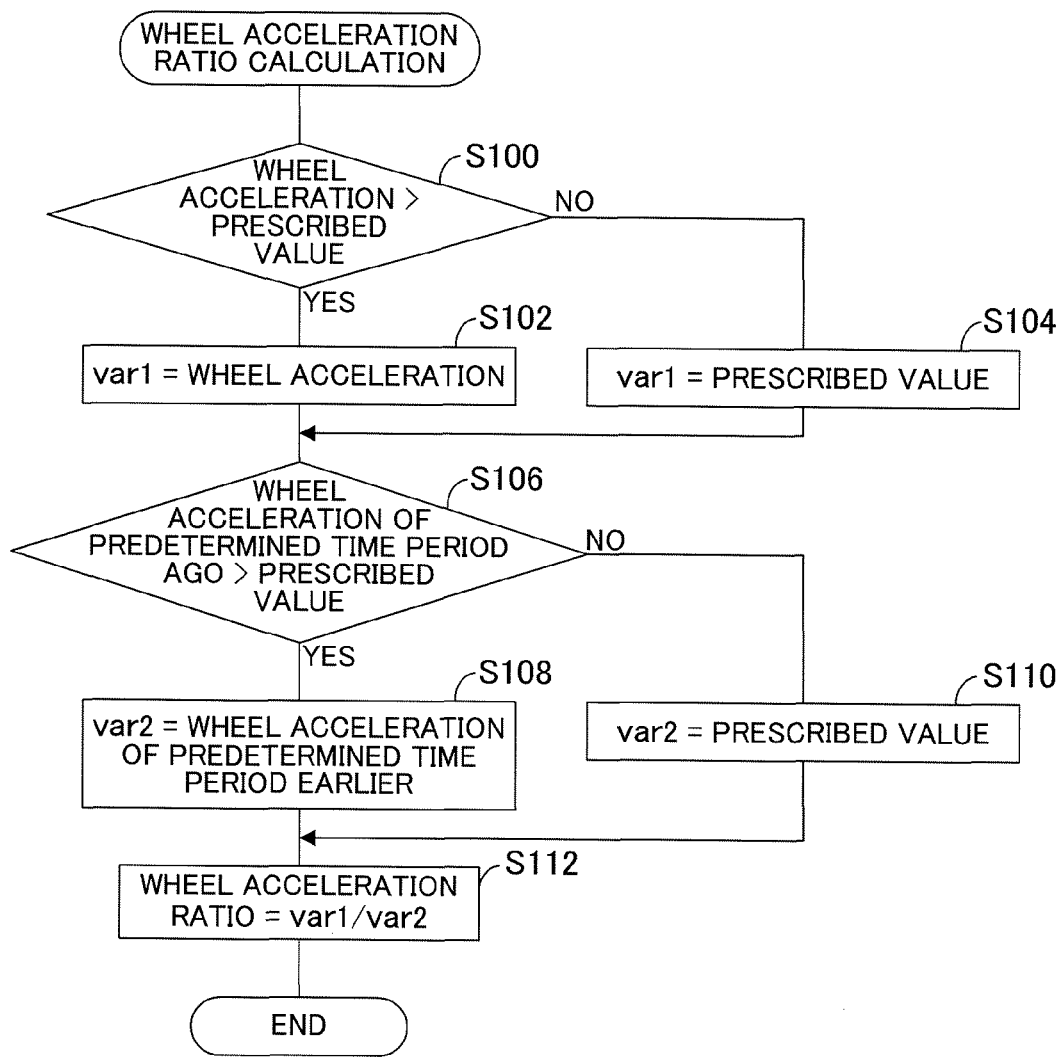
FIG. 3 is a subroutine flowchart showing a wheel acceleration ratio calculating process in the FIG. 2 flowchart.

FIG. 3 is a subroutine flowchart showing a process of the calculation.

First, in S100, one of accelerations of the front and rear wheels 30F, 30R, i.e., the front wheels 30FL, 30FR and rear wheels 30RL, 30RR whose rotational speeds are detected by the wheel speed sensors 44 is calculated. Preferably, the accelerations of all four wheels are calculated, and it is determined whether each of these accelerations exceeds a prescribed value (e.g., 1 [m/s$^2$]).

To be more specific, in S100, the ECU 54 reads out a speed obtained from the output of the wheel speed sensor 44, obtains a difference between the read-out value and a speed that was obtained from the output of the wheel speed sensor 44 a certain time period earlier (obtained in a program loop of the FIG. 2 flowchart of the certain time period earlier), calculates the acceleration of the subject wheel (for instance, the front wheel 30FL) by dividing the obtained difference by the certain time period, and determines whether the calculated acceleration exceeds the prescribed value.

When the result in S100 is affirmative, the program proceeds to S102 in which the calculated wheel acceleration is set as a value var1, while when the result is negative, the program proceeds to S104 in which the prescribed value is set as the value var1. In other words, when the calculated wheel acceleration is equal to or less than the prescribed value, the prescribed value is set as the calculated wheel acceleration.

Setting the prescribed value as the calculated wheel acceleration when the actually-calculated wheel acceleration is equal to or less than the prescribed value, is to prevent the wheel acceleration ratio from becoming excessively low which may be caused when the wheel acceleration is too low due to a temporal cause or cruise control, etc., thereby preventing deterioration in accuracy of the skid detection.

Next, the program proceeds to S106 in which it is determined whether the wheel acceleration calculated a predetermined time period (e.g., 1 second) earlier exceeds the prescribed value. When the result in S106 is affirmative, the program proceeds to S108 in which the wheel acceleration calculated the predetermined time period earlier is set as a value var2.

When the result in S106 is negative, the program proceeds to S110 in which the prescribed value is set as the value var2. Specifically, also when the wheel acceleration calculated the predetermined time period earlier is equal to or less than the prescribed value, the prescribed value is set as the calculated wheel acceleration.

Setting the prescribed value as the calculated wheel acceleration when the wheel acceleration actually-calculated the predetermined time period earlier is equal to or less than the prescribed value, is to prevent a ratio between the wheel accelerations to be obtained in S112 from becoming excessively high which may be caused when the wheel acceleration is too low (i.e., a value lower than 1 [m/s$^2$]) due to a temporal cause or cruise control, etc., thereby preventing deterioration in accuracy of the skid detection.

Next the program proceeds to S112 in which the value var1 is divided by the value var2 to calculate the ratio between those two values, i.e., the ratio between two accelerations (calculated at different time points) among the accelerations sequentially calculated with the same wheel. More precisely, a ratio between two accelerations calculated during the predetermined time period among the accelerations sequentially calculated with the same wheel, is calculated. The foregoing process is performed with all of the four wheels.

Since the FIG. 2 flowchart is carried out at the predetermined intervals, the rotational speeds of the four wheels 30FL, 30FR, 30RL, 30RR are sequentially calculated at the predetermined intervals and the wheel acceleration ratios of the four wheels are sequentially calculated based on the calculated rotational speeds.

Returning to the explanation on the FIG. 2 flowchart, the program proceeds to S12 in which it is determined whether a driving force is small. Specifically, it is determined whether the driving force is equal to or less than an appropriately-set driving force preset value. The team of "driving force" represents the driving force of the vehicle 10 to be calculated by the following equation.

$$\text{Driving force} = \text{Engine torque} \times \text{Pulley ratio} \times \text{Final ratio} / \text{Tire diameter}$$

In the above equation, the engine torque is output torque of the engine 12 acquired through the communication with the ECU 60 (which is calculated based on an engine speed, engine load, etc.), the pulley ratio is a transmission ratio (gear ratio) of the CVT 14 calculated by the ECU 54, the final ratio is a fixed value, and the tire diameter is a diameter of the wheel 30.

When the result in S12 is affirmative, the program proceeds to S14 in which it is determined whether change of the driving force is small. Specifically, it is determined whether a driving force change amount is equal to or less than an appropriately-set driving force change amount preset value. The term of "driving force change amount" represents a change amount of the driving force of the vehicle 10 to be calculated by the following equation.

$$\text{Driving force change amount} = \text{Present driving force} - \text{Driving force of predetermined time period earlier}$$

In the above equation, the present driving force is the driving force calculated in the present program loop of the FIG. 2 flowchart, and the driving force of predetermined time period earlier is the driving force calculated in the program loop of the FIG. 2 flowchart the predetermined time period (e.g., 1 second) earlier.

When the result in S14 is affirmative, the program proceeds S 16 in which each of the wheel acceleration ratios of the four wheels calculated in S10 is compared to a predetermined value. It is determined whether the calculated ratio exceeds the predetermined value. The predetermined value can be set to, for example, double the value of a prior calculated ratio.

When the result in S16 is affirmative, the program proceeds to S18 in which it is determined that a skid has occurred, i.e., the subject wheel or some (or all) wheels including at least the subject wheel has/have skidded. To be specific, when assuming that the subject wheel is a left front wheel 30FL, it is determined that a skid(s) of one of the following four patterns has occurred.
1. A skid of only 30FL
2. Skids of 30FL, 30FR
3. Skids of 30FL, 30RL
4. Skids of 30FL, 30FR, 30RL, 30RR (Simultaneous skids of the front and rear wheels)

The same can be said for the other three wheels 30FR, 30RL, 30RR. It should be noted that, since which pattern of the above 1 to 4 is applicable can not be discriminated in the embodiment, the affirmative result in S16 means that the subject wheel or some (all) wheels including at least the subject wheel has/have skidded, more precisely, that there is a possibility of the simultaneous skids of the front and rear wheels.

On the other hand, when the result in S16 is negative, the program proceeds to S20 in which it is determined that no skid has occurred. When the result in S12 or S14 is negative, similarly the program proceeds to S20 in which the same determination is made.

In other words, in the case where the ratio calculated when the driving force is at or below the driving force preset value exceeds the predetermined value and the ratio calculated when the driving force change amount is at or below the driving force change amount preset value exceeds the predetermined value, it is determined that the subject wheel or some (or all) wheels including at least the subject wheel has/have skidded.

Meanwhile, a step of S12 or S14 in the FIG. 2 flowchart may be removed to configure such that, in the case where the ratio calculated when the driving force is at or below the driving force preset value exceeds the predetermined value or in the case where the ratio calculated when the driving force change amount is at or below the driving force change amount preset value exceeds the predetermined value, it is determined that the subject wheel or some (or all) wheels including at least the subject wheel has/have skidded.

As explained in the forgoing, it should be noted that, the accelerations of the four wheels 30FL, 30FR, 30RL, 30RR are sequentially calculated, and the process of the FIG. 2 flowchart is sequentially performed with the four wheels one by one to detect a skid(s).

As stated above, the embodiment is configured to have an apparatus (ECU 54) for detecting a skid of a vehicle (10) having a prime mover (engine 12) and a transmission (CVT 14) adapted to change an output of the prime mover in speed to drive front wheels (30F) and rear wheels (30R), characterized by: wheel rotational speed detecting means (wheel speed sensor 44) for detecting rotational speeds (wheel speed) of one (more precisely, all) of the front and rear wheels (30F, 30R (30FL, 30FR, 30RL, 30RR)); wheel acceleration ratio calculating means (S10, S100 to S112) for sequentially calculating accelerations (wheel acceleration var1, var2) of the one (more precisely, all) of the wheels based on the detected rotational speeds and calculating a ratio (var1/var2) between two accelerations (of the same wheel calculated at different time points) among the sequentially-calculated accelerations; and skid determining means (S12 to S20) for comparing the ratio between the two accelerations with a predetermined value and determining that the one of the wheels has skidded or some or all of the wheels including the one have skidded when the calculated ratio between the two accelerations exceeds the predetermined value. With this, in not only the case where one of the front and rear wheels 30F, 30R skids but also the case where some (or all) of the wheels including the one, i.e., the front and rear wheels are simultaneously skid, it becomes possible to accurately detect (occurrence of) the skid(s), more precisely, a possibility of the simultaneous skids of the front and rear wheels.

To be more specific, the technique of the Patent Reference 1 mentioned first is configured to determine whether a skid has occurred based on the difference between the average speed of the front wheels and that of the rear wheels. As a result, when the front and rear wheels 30F, 30R simultaneously skid in the four-wheel drive vehicle 10, since the difference between the front and rear wheel speeds is not generated, the simultaneous skids of the front and rear wheels can not be detected.

In contrast, in the apparatus according to this embodiment, it is configured to detect a skid(s) not by detecting the difference between the wheel speeds of the front and rear wheels 30F, 30R but by observing one of the wheels 30, for instance, the left front wheel 30FL, right rear wheel 30RR or the like, i.e., detect (occurrence of) a skid(s) without comparing rotational speeds of two wheels. Consequently, it becomes possible to accurately detect not only the skid of the observed one of the wheels 30 but also the simultaneous skids of some or all of the wheels 30F, 30R, more precisely, a possibility of the simultaneous skids of the front and rear wheels 30F, 30R.

In the apparatus, the wheel acceleration ratio calculating means calculates the ratio (var1/var2) between the two accelerations calculated during a predetermined time period (e.g., 1 second) among the sequentially-calculated accelerations (S100 to S112). With this, in addition to the above effect, since only the values calculated during the predetermined time period are used, the detection accuracy can be improved.

In the apparatus, the skid determining means determines that the one of the wheels has skidded or some or all of the wheels including the one have skidded when a driving force of the vehicle 10 is equal to or less than a driving force preset value and the calculated ratio between the two accelerations exceeds the predetermined value (S12, S18). With this, in addition to the above effects, it becomes possible to prevent the false detection, thereby improving the detection accuracy.

In the apparatus, the skid determining means determines that the one of the wheels has skidded or some or all of the wheels including the one have skidded when a driving force change amount of the vehicle is equal to or less than a driving force change amount preset value and the calculated ratio between the two accelerations exceeds the predetermined value (S14, S18). With this, in addition to the above effects, similarly, it becomes possible to prevent the false detection, thereby improving the detection accuracy.

In the apparatus, the wheel acceleration ratio calculating means sets a prescribed value (e.g., 1 $[m/s^2]$) as the calculated acceleration when the calculated acceleration (more exactly, the calculated acceleration or the acceleration calculated the predetermined time period (e.g., 1 second) earlier) is equal to or less than the prescribed value and calculates the ratio between the two accelerations among the sequentially-calculated accelerations (S100 to S112). With this, in addition to the above effects, it becomes possible to not take into consideration the case where the wheel acceleration becomes equal to or less than the prescribed value due to a temporal cause, etc., and therefore, prevent the wheel acceleration ratio (var1/var2) from becoming excessively high or low, thereby improving the detection accuracy. Note that the prescribed value may be a value more than 1 $[m/s^2]$ instead of 1 $[m/s^2]$.

It should be noted that, although, in the foregoing, the acceleration ratios of all of the four wheels 30FL, 30FR, 30RL, 30RR are calculated in the operation shown in FIG. 3, the acceleration ratios may be calculated with some of the four wheels. The expression of "one of the front and rear wheels" in claim 1 indicates this.

It should also be noted that, although the FIG. 2 flowchart is executed at the predetermined intervals (e.g., 10 milliseconds) so that the acceleration is calculated on a regular basis, it suffices if the acceleration is sequentially calculated and the calculation does not have to be carried out on a regular basis.

It should also be noted that, although the four-wheel drive vehicle is exemplified, this invention can also be applied to a two-wheel drive vehicle. Further, although the CVT is taken as an example of a transmission, this invention is applicable to any four-wheel drive vehicle having an automatic transmission that allows distinct gear ratios to be selected.

It should also be noted that, although examples of the predetermined value, prescribed values, preset values, etc. are shown in the foregoing, they are only examples and not limited thereto.

INDUSTRIAL APPLICABILITY

In a skid detecting apparatus for a vehicle having an engine and a CVT changing an output of the engine in speed to drive front wheels and rear wheels, it is configured to detect rotational speeds of one of the front and rear wheels, sequentially calculate accelerations of the one of the wheels based on the detected rotational speeds, calculate a ratio between two accelerations of the same wheel calculated at different time points among the sequentially-calculated accelerations, compare the ratio between the two accelerations with a predetermined value and determine that the one of the wheels has skidded or some or all of the wheels including the one have skidded when the calculated ratio between the two accelerations exceeds the predetermined value, thereby enabling to accurately detect not only a skid of one of the front and rear wheels but also simultaneous skids of some of the wheels.

DESCRIPTION OF SYMBOLS

10 Vehicle, 12 Internal combustion engine, 14 Transmission (CVT), 24 Transfer, 30 Wheel(s), 30FL, 30FR Front wheels (Wheels), 30RL, 30RR Rear wheels (Wheels), 32 Propeller shaft, 36 Viscous coupling (VC), 44 Wheel speed sensor, 46 Accelerator position sensor, 50 Brake switch, 54 ECU (Electronic Control Unit)

The invention claimed is:

1. An apparatus for detecting a skid of a vehicle having a prime mover and a transmission adapted to change an output of the prime mover in speed to drive front wheels and rear wheels,
characterized by:
wheel rotational speed detecting means for detecting rotational speeds of one of the front and rear wheels;
wheel acceleration ratio calculating means for sequentially calculating accelerations of the one of the wheels based on the detected rotational speeds and calculating a ratio between two accelerations among the sequentially-calculated accelerations; and
skid determining means for comparing the ratio between the two accelerations with a predetermined value and determining that the one of the wheels has skidded or some or all of the wheels including the one have skidded when the calculated ratio between the two accelerations exceeds the predetermined value.

2. The apparatus according to claim 1, wherein the wheel acceleration ratio calculating means calculates the ratio between the two accelerations calculated during a predetermined time period among the sequentially-calculated accelerations.

3. The apparatus according to claim 1, wherein the skid determining means determines that the one of the wheels has skidded or some or all of the wheels including the one have skidded when a driving force of the vehicle is equal to or less than a driving force preset value and the calculated ratio between the two accelerations exceeds the predetermined value.

4. The apparatus according to claim 1, wherein the skid determining means determines that the one of the wheels has skidded or some or all of the wheels including the one have skidded when a driving force change amount of the vehicle is equal to or less than a driving force change amount preset value and the calculated ratio between the two accelerations exceeds the predetermined value.

5. The apparatus according to claim 1, wherein the wheel acceleration ratio calculating means sets a prescribed value as the calculated acceleration when the calculated acceleration is equal to or less than the prescribed value and calculates the ratio between the two accelerations among the sequentially-calculated accelerations.

6. A method for detecting a skid of a vehicle having a prime mover and a transmission adapted to change an output of the prime mover in speed to drive front wheels and rear wheels,
wherein the improvement comprises:
a step for detecting rotational speeds of one of the front and rear wheels;
a step for sequentially calculating accelerations of the one of the wheels based on the detected rotational speeds and for calculating a ratio between two accelerations among the sequentially-calculated accelerations; and
a step for determining a skid using a processor by comparing the ratio between the two accelerations with a predetermined value and determining that the one of the wheels has skidded or some or all the wheels including the one have skidded when the calculated ratio between the two accelerations exceeds the predetermined value.

7. The method according to claim 6, wherein the step for calculating the ratio between two accelerations calculates the ratio between the two accelerations which were calculated during a predetermined time period among the sequentially-calculated accelerations.

8. The method according to claim 6, wherein the step for skid determining determines that the one of the wheels has skidded or some or all of the wheels including the one have skidded when a driving force of the vehicle is equal to or less than a driving force preset value and the calculated ratio between the two accelerations exceeds the predetermined value.

9. The method according to claim 6, wherein the step for skid determining determines that the one of the wheels has skidded or some or all of the wheels including the one have skidded when a driving force change amount of the vehicle is equal to or less than a driving force change amount preset value and the calculated ratio between the two accelerations exceeds the predetermined value.

10. The method according to claim 6, wherein the step for sequentially calculating accelerations sets a prescribed value as the calculated acceleration when the calculated acceleration is equal to or less than the prescribed value and calculates the ratio between the two accelerations among the sequentially-calculated accelerations.

* * * * *